United States Patent [19]

Brodie et al.

[11] 4,189,783

[45] Feb. 19, 1980

[54] MASS STORAGE OF BOOKS

[75] Inventors: Ivor Brodie; John Kelly, both of Palo Alto, Calif.

[73] Assignee: Stanford Research Institute, Menlo Park, Calif.

[21] Appl. No.: 940,705

[22] Filed: Sep. 8, 1978

Related U.S. Application Data

[63] Continuation of Ser. No. 772,026, Feb. 25, 1977, abandoned.

[51] Int. Cl.$^2$ ............................................. G11C 11/42
[52] U.S. Cl. ..................................... 365/128; 365/96; 365/127; 179/100.3 V; 358/128.5
[58] Field of Search ................................. 365/96, 128; 179/100.3 V; 358/128

[56] References Cited

U.S. PATENT DOCUMENTS

| | | | |
|---|---|---|---|
| 3,198,880 | 8/1965 | Toulon | 179/100.3 V |
| 3,939,302 | 2/1976 | Kihara | 178/6.6 R |
| 3,980,818 | 9/1976 | Browning | 178/6.6 R |

*Primary Examiner*—Terrell W. Fears
*Attorney, Agent, or Firm*—Freilich, Hornbaker, Wasserman, Rosen & Fernandez

[57] ABSTRACT

A mass data storage arrangement such as for books, is provided, by recording the data in the form of one micron pits in radial rows within spiral grooves of a disc. A reading element comprises a CRT providing a light beam output, which is focused down to one micron in size. The spot output of the CRT is scanned across each row having the presence or absence of pits. The light reflected from the disc is modulated by the presence or absence of pits and is reflected to a photomultiplier. The output of the photomultiplier is decoded and then displayed in human language form.

15 Claims, 4 Drawing Figures

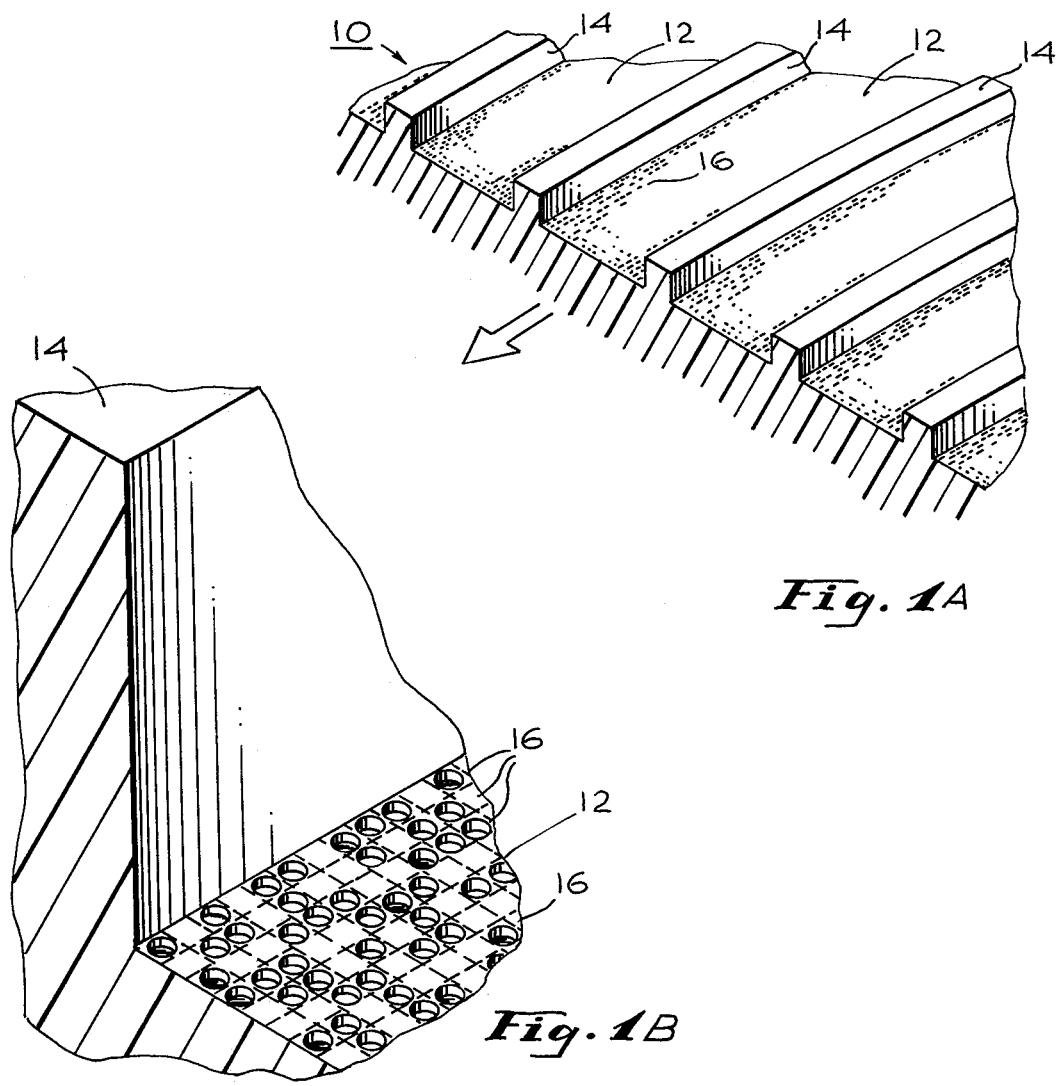
Fig. 1A
Fig. 1B
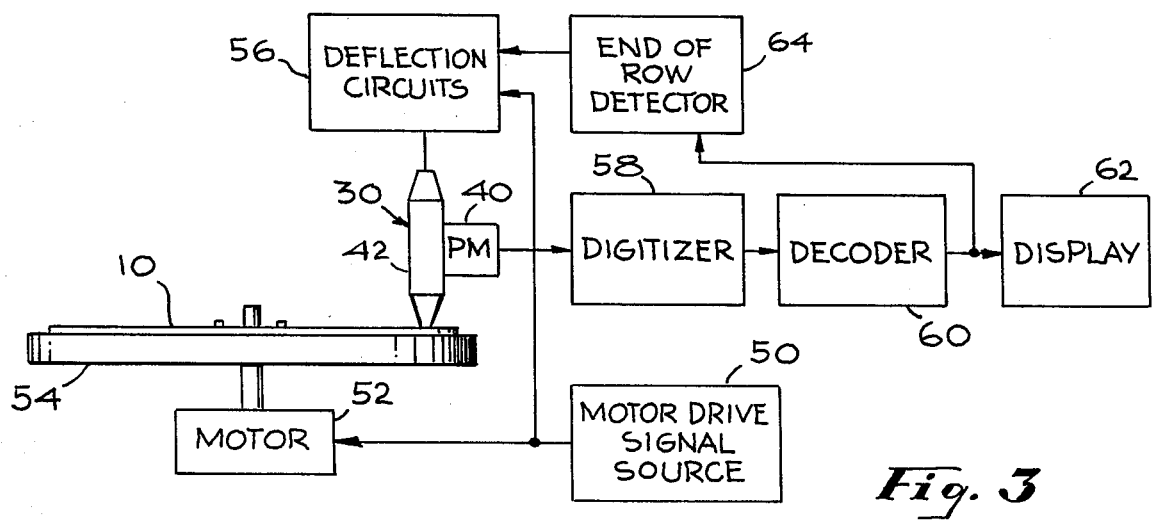
Fig. 3

MASS STORAGE OF BOOKS

This is a continuation of application Ser. No. 772,026, filed Feb. 25, 1977 and now abandoned.

BACKGROUND OF THE INVENTION

This invention relates to apparatus for the mass storage of data and more particularly to a method and means for reading data stored on a record.

The volume production of recordings of television programs on 12 inch discs, with play back times of up to one-half hour has been demonstrated. Assuming about 1 million bits of information per frame, 30 frames per second, this means that $10^{10}$ bytes are being stored on a single 12 inch disc. The error rate that can be tolerated on television displays is fairly high as the frames are being rapidly changed and the eye integrates out many of the errors that may occur, particularly as it is unlikely that an error would occur in the same place on consecutive frames. An error, in say, 10 identifiable locations, on a frame, or one in $10^5$ bits could be comfortably tolerated, thus easing the requirements in perfection of the recording technique and the playback head, and the necessity for keeping the record free from dust and scratches.

If the same technique were to be used for the storage of computer generated binary coded information, the error rate would have to be much lower. For example, if such a device were to store information for a telephone directory, the change in a single digit would give a wrong number, thus an error rate of one in $10^{10}$ would be more appropriate. However, books, which consist of straight reportage, can use the television recording techniques since, a misspelled word, while it may be a source of amusement, rarely, in context, represents any loss of information. By using an 8-bit ACSII code, large amounts of literature could be condensed on a single record. At $10^{10}$ characters, assuming an average of 5 characters per word, 2000 words per page and a 500 page volume, on a two-sided record, this amounts to 4000 volumes per disc; more novels than most people read in a lifetime.

While a fairly high cost can be borne in the capital equipment for making such discs, both the cost of the disc and the capital equipment cost of the readout device must be reasonably low in order to appeal to a mass market.

OBJECTS AND SUMMARY OF THE INVENTION

An object of this invention is to provide a disc and readout system of the type described, whose cost would be reasonably low.

Yet another object of the present invention is the provision of a novel and useful mass information recording and readout system.

The foregoing and other objects of the invention may be achieved in an arrangement wherein the recording disc has the data recorded thereon in the form of the presence or absence of pits. These pits are recorded in radial rows within the grooves on a disc, which are laid down in the form of a spiral. A flat face cathode ray tube (CRT) with an electrostatic deflection system, and a 0.001 inch diameter spot is used as a light source. This is focused through a reduction microscope lens down to one micron in size. This spot is scanned across the width of the groove with one pair of deflection plates and fixed voltages are used on the remaining deflection plates to align the movement of this spot with the row of pits. The last few pits, equaling a byte on a row, provides a synchronizing signal so that the CRT spot flies back to the first position. The scanning frequency is synchronized to the rotation of the turntable so that a groove moves one micron during a spot scan time. In the absence of a pit the spot will be specularly reflected from the surface of the record; in the presence of a pit, the light is largely scattered. Reflected light is passed back through the lens and is reflected by a half silvered mirror positioned to pick up the reflected light, into a photomuliplier. The signal from the photomuliplier is then digitized and fed into the decoding circuitry which can then provide its output for display in a conventional manner.

The novel features of the invention are set forth with particularity in the appended claims. The invention will best be understood from the following description when read in conjunction with the accompanying drawings.

BRIEF DESCRIPTION OF THE DRAWINGS

FIGS. 1a and 1b are respectively a partial view and an enlarged view of a section of a disc, in accordance with this invention.

FIG. 3 is a block schematic drawing in accordance with this invention.

DESCRIPTION OF THE PREFERRED EMBODIMENT

Figure 2:
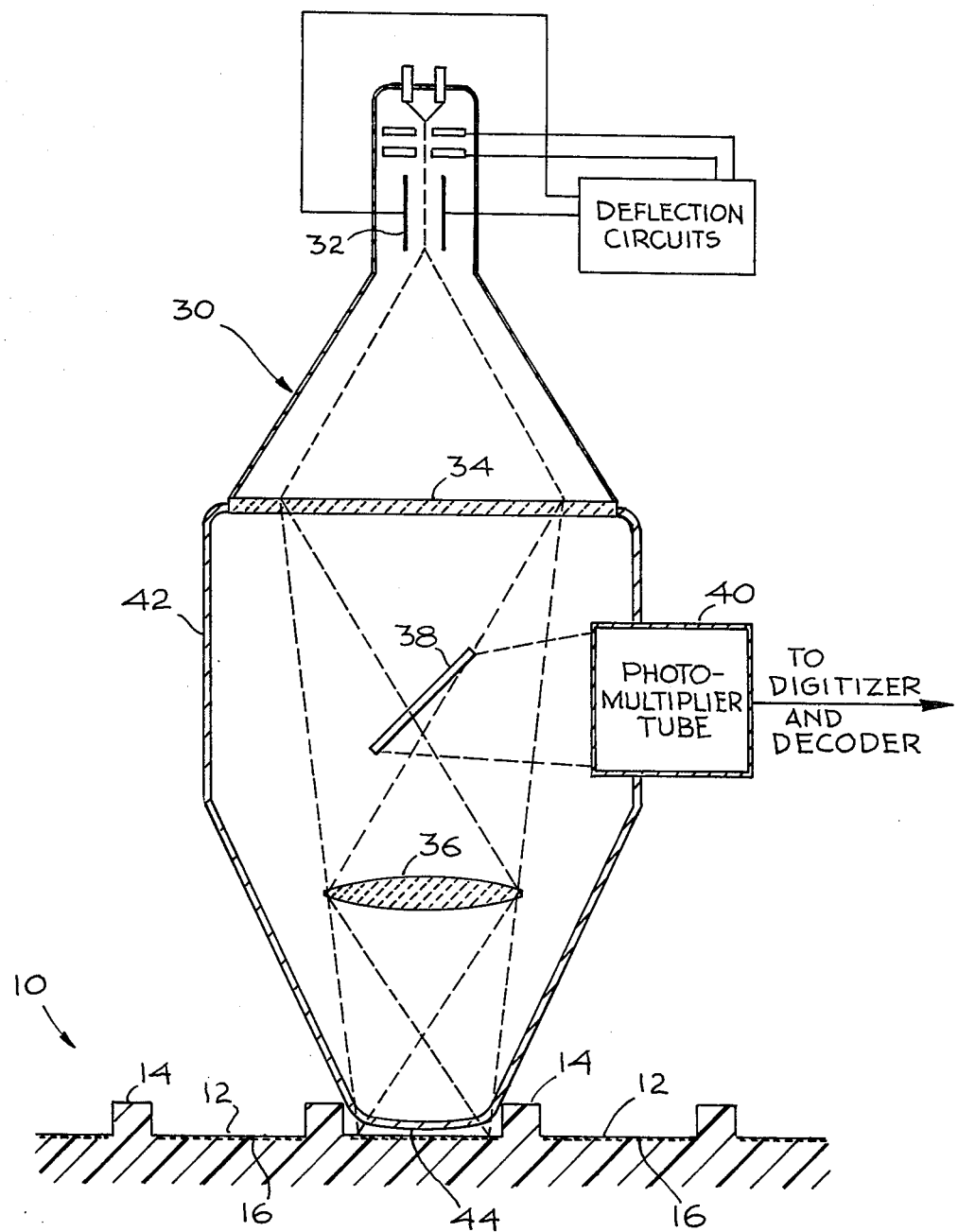
FIG. 2 illustrates a reading system in accordance with this invention.

As previously indicated, the surface of the proposed recording disc would contain a spiral groove. Rows of pits would be arranged radially within this groove, each pit being a depression within an area one micron on a side. The presence or absence of a pit indicates a one or a zero. The width of the groove is chosen so as to contain an appropriate number of bytes and to give a convenient size to the reading stylus; for example, 100 bytes equal 800 microns equals 0.032 inches.

Referring to FIG. 1a, cross-sectional isometric view of a record 10 may be seen having grooves 12, with walls 14 between the grooves. FIG. 1b shows an enlarged section adjacent one of the walls 14 illustrating pits 16, and rows having the presence or absence of pits.

The wall thickness between the grooves, for reasonable strength should be about ¼ of the groove width, i.e. 200 microns equals 0.008 inch.

Referring to FIG. 2, there may be seen a cross-sectional view of a reading system in accordance with this invention. This includes a CRT, 30, having a set of deflection plates 32, the CRT has a one inch diameter flat face 34. It has an electrostatic deflection system which provides a 25 micron (0.001 inch) diameter spot, which is used as a light source. This is focused through a 25 power reduction microscope lens 36, of one cm focal length, down to a one micron spot size. Using a 0.4 $\mu$m wavelength monochromatic light, this should not be difficult. In the path of the spot of light, there is supported a half silvered mirror 38, which passes the light from the CRT therethrough, but will reflect light received from the surface of the disc 10 onto a photomultiplier 240.

This spot is scanned across the width of the groove with one pair of deflection plates, and fixed voltages are used on the remaining deflection plates to align the movement of the spot with the row of pits. For 800 pits in the width of the groove, the spot on the CRT will have to move 25×0.032 inches equals 0.8 inches. The last byte on the reading groove will give a synchronizing signal so that the CRT spot flies back to the first position. The scanning frequency is synchronized to the rotation of the turntable so that the groove moves one micron during a spot scan time.

The CRT is supported on a housing 42 that has its other end 44, in the form of a "needlepoint" that rides in the groove of the housing. The assembly of the CRT 10 and housing 42 may be supported in well known manner, as by a rigid bar, across the face of the disc, with mechanisms to lift the housing and CRT out of the groove and move it in a radial direction during selective retrieval operation.

Reading is accomplished by scanning each row of pits with the one micron focus light spot. In the absence of a pit, the spot will be specularly reflected from the surface of the record. In the presence of the pit, the light is largely scattered. Reflected light is passed back through the lens and reflected by the mirror 38 to the photomultiplier 40.

Referring now to FIG. 3 there may be seen a schematic drawing of the circuit arrangement which is used to convert the output of the reader to human language information. It was pointed out that the scanning frequency for the CRT light is synchronized to the rotation of the turntable so that the groove moves one micron during a spot scan time. The motor drive signal source 50, provides electrical current to drive the motor 52, which drives the turntable 54, on which the record sits. The motor drive signal source also provides synchronizing signals to the deflection circuits 56, which sync the scanning frequency of the CRT to the turntable rotation to provide the requisite synchronization of the light spot to the turntable movement.

The photomultiplier output is applied to a digitizer 58, which serves the function of shaping any signal output of the photomultiplier in a response to the absence of a pit, into a pulse. The digitizer 58 output is applied to a decoder 60, which serves the function of inverting the 8-bit ASCII code received into letters. Circuits for performing this function are well-known and may be, for example, a buffer which receives 8 bits of digitizer output and then addresses a ROM, which provides the character output represented by the code. The letters derived from the decoder output are applied to any suitable display 62 or printout device, which displays these letters in the human language form.

The last byte in a row provides a synchronizing signal, which is detected by an end of row detector 64, which has its input connector to the output of the decoder 60. When the end of row detector detects the last byte, it provides a signal output to the deflection circuits instructing it to return the CRT spot back to its starting position.

Assuming a reading rate of $10^8$ bits per second, the disc will rotate at the rate of one micron in $10^{-8} \times 800$ seconds. The circumference of the track at intermediate 9-inch diameter is $\pi \times 9 \times 2.54$ cm, hence it will take $\pi \times 9 \times 2.54 \times 10^4 \times 10^{-8} \times 800$ sec for one revolution $= 5.7$ seconds. This is equivalent to 10.5 rpm. This is an extremely practical rate for a precision turntable and allows variations in the rotation speed as a function of radius to permit uniformly high data storage density, a feature not generally available in disc recordings. Provision can be made to search the disc using key addresses, words and phrases. This will require a high reading rate during the search mode. The low mechanical scan rate, however, minimizes the wear rate for both the needle and the disc and thus provides for long life operation and little or no needle bounds.

To make a disc of the type described, a master mold is produced by electron beam lithography which in turn receives its input from computer generated tape or from an optical character recognition device which may be used to directly convert the printed matter from a report or book to digital form. A patent, U.S. Pat. No. 3,760,383, describes a recording system which may be employed for making discs of the type intended. After the master mold has been made inexpensive plastic discs may be pressed therewith for mass distribution.

There has accordingly been described and shown hereinabove a novel and useful reading system for a mass information storage system.

We claim:

1. A mass information storage system comprising:
    a disc having data recorded thereon as the presence or absence of pits, aligned in successive radial rows within the grooves of a spiral on the surface of said disc, the data stored in a row being in a single groove and at least some of the data including more than one pit and each groove having two spaced-apart opposite walls extending therefrom;
    means for rotating said disc;
    light generating means for generating a light beam having a size on the order of a pit, said means including means for deflecting said light beam to cause it to scan across each of said rows, as said disc is rotated, said light generating means including, cathode ray tube means for producing the light beam, hollow support means for supporting said cathode ray tube at a predetermined distance above said disc, said hollow support means having one end at which the face of said cathode ray tube is positioned, and an opposite end for engaging a groove of said spiral by being located between the two spaced-apart opposite walls extending from the groove and lens means supported in said hollow support means for reducing said light beam from said source to a size on the order of a pit;
    means for detecting light reflected from locations in said rows where there are no pits as said light beam is scanned across the row, and for converting said detected light reflections into electrical signals; and
    means for converting said electrical signals into a human language display.

2. A system as recited in claim 1 wherein said means for detecting light reflected from said locations on the surface of said disc comprises:
    mirror means, positioned above a groove, for passing therethrough light from said source and for directing reflected light derived from one of said locations along a path which is different from the path of light therethrough, and
    photomultiplier means positioned at said path for intercepting light reflected therealong by said mirror means.

3. A system as recited in claim 1 wherein each row in addition to storing data further stores at one end thereof end-of-row information, and said system further includes means responsive to the electrical signals produced as a function of the light reflected from said end-of-row information to control said means for deflecting to cause said light beam to start scanning a subsequent row.

4. A system as recited in claim 1 further including means for connecting said means for rotating said disc to said means for deflecting to control the rate at which the light beam is made to scan each row as a function of the rotation of said disc.

5. A system as recited in claim 4 wherein each row in addition to storing data further stores at one end thereof end-of-row information, and said system further includes means responsive to the electrical signals produced as a function of the light reflected from said end-of-row information to control said means for deflecting to cause said light beam to start scanning a subsequent row.

6. A mass information storage and retrieval system comprising:
   data storage means having data stored therein as the presence or absence of pits in successive rows, aligned in a direction substantially perpendicular to the direction of each of n grooves on the surface of said data storage means, where n is an integer not less than one, the data stored in any row being in a single groove and at least some of the data including more than one pit and each groove having a pair of spaced-apart walls extending therefrom;
   light generating means including a source of light and means for scanning said light across a row;
   means for directing said light to one of said rows in one of said grooves, and end means located between the pair of walls extending from the groove with the row to which the light is directed;
   moving means for moving said data storage means whereby said end means follows in said groove and said light generating means direct said light to successive rows in the groove;
   means for detecting light which is reflected from locations in each row through which said light is scanned where there are no pits, and for converting the detected light reflections into related signals; and
   means responsive to said related signals for reproducing the stored data.

7. A system as described in claim 6 wherein said light generating means include means for controlling the size of the light which reaches said row in said groove to be on the order of a pit.

8. A system as described in claim 6 wherein said grooves form a continuous spiral, and said moving means comprise means for rotating said data storage means whereby said end means is engagable in one of the grooves of said spiral.

9. A system as described in claim 8 wherein said light generating means includes lens means for reducing the light from said source to a size on the order of a pit and for directing the light across a row of pits, the light being scanned across the row from a first end thereof to an opposite second end.

10. A system as described in claim 9 further including means for controlling said light generating means to direct the light to the first end of a row after a preceding row has been scanned to the second end thereof.

11. A system as described in claim 6 wherein said light scans each row from a first end thereof near one wall of the groove to a second end near the opposite groove wall, and each row includes end-of-row information and said system further includes decoding means for decoding signals produced when said end-of-row information is scanned and for producing an end-of-row signal and means for applying said end-of-row signal to said light generating means to initiate the scanning of said light across a subsequent row from the first end thereof.

12. A system as described in claim 6 further including means for connecting said moving means to said light generating means to control the rate at which the light scans each row as a function of the speed of movement of said data storage means.

13. A system as described in claim 12 wherein said grooves form a continuous spiral, and said moving means comprise means for rotating said data storage means whereby said end means is engagable in one of the grooves of said spiral, and said moving means control said light generating means to control the rate at which the light scans each row as a function of the speed of rotation of said data storage means.

14. A system as described in claim 12 wherein said light generating means includes lens means for reducing the light from said source to a size on the order of a pit and for directing the light across a row of pits, the light being scanned across the row from a first end thereof to an opposite second end.

15. A system as described in claim 14 wherein each row includes end-of-row information and decoding means coupled to said means for detecting for controlling said light generating means to start scanning a succeeding row from the first end thereof when said means for detecting convert the light from said end-of-row information into predetermined signals.

* * * * *